(12) United States Patent
Tsukamoto et al.

(10) Patent No.: US 11,391,705 B2
(45) Date of Patent: Jul. 19, 2022

(54) SAMPLE INJECTION DEVICE

(71) Applicant: JASCO Corporation, Tokyo (JP)

(72) Inventors: Atsushi Tsukamoto, Tokyo (JP); Kengo Yoshida, Tokyo (JP); Keisuke Hasegawa, Tokyo (JP)

(73) Assignee: JASCO Corporation, Tokyo (JP)

( * ) Notice: Subject to any disclaimer, the term of this patent is extended or adjusted under 35 U.S.C. 154(b) by 299 days.

(21) Appl. No.: 16/723,178

(22) Filed: Dec. 20, 2019

(65) Prior Publication Data

US 2020/0408727 A1 Dec. 31, 2020

(30) Foreign Application Priority Data

Dec. 26, 2018 (JP) .............................. JP2018-242090

(51) Int. Cl.
*G01N 30/20* (2006.01)
*G01N 30/22* (2006.01)
*G01N 30/38* (2006.01)

(52) U.S. Cl.
CPC ............. *G01N 30/20* (2013.01); *G01N 30/22* (2013.01); *G01N 30/38* (2013.01); *G01N 2030/201* (2013.01); *G01N 2030/207* (2013.01); *G01N 2030/385* (2013.01)

(58) Field of Classification Search
CPC ....... G01N 2030/201; G01N 2030/207; G01N 2030/385; G01N 30/20; G01N 30/22; G01N 30/38
See application file for complete search history.

(56) References Cited

U.S. PATENT DOCUMENTS

| | | | | |
|---|---|---|---|---|
| 2010/0147086 A1* | 6/2010 | Koster | ............... | G01N 35/1097 73/863.72 |
| 2010/0288025 A1* | 11/2010 | Hochgraeber | ......... | G01N 30/32 73/61.55 |
| 2013/0333452 A1* | 12/2013 | Suzuki | ............... | G01N 35/1095 73/64.56 |
| 2015/0125962 A1* | 5/2015 | Oguri | ..................... | G01N 30/12 436/157 |
| 2016/0187304 A1* | 6/2016 | Wikfors | ................. | G01N 30/20 73/863 |
| 2016/0377580 A1* | 12/2016 | Wachinger | ............. | G01N 30/20 73/61.55 |

FOREIGN PATENT DOCUMENTS

JP 6365323 B2 8/2018
WO WO-2014199198 A1 * 12/2014 ............. G01N 30/20

* cited by examiner

*Primary Examiner* — David L Singer

(74) *Attorney, Agent, or Firm* — Rankin, Hill & Clark LLP

(57) ABSTRACT

A sample injection device includes: a sample container; a sample loop; a syringe, a liquid transfer channel; a first channel switching valve that switches the sample loop to be detachable to the liquid transfer channel; and a second channel switching valve that switches the channel of the syringe together with the first channel switching valve.

5 Claims, 8 Drawing Sheets

SAMPLE INJECTION DEVICE

RELATED APPLICATIONS

This application claims the priority of Japanese Patent Application No. 2018-242090 filed on Dec. 26, 2018, the disclosure of which is incorporated herein by reference in its entirety.

FIELD OF THE INVENTION

The present invention relates to a sample injection device, and particularly to improvement in a technique of a large-volume sample injection in high-performance liquid chromatography, supercritical fluid chromatography and the like.

BACKGROUND OF THE INVENTION

Chromatography is generally known as a method for separation analysis of a substance. When a mobile phase used in this chromatography is liquid, it is called as liquid chromatography (LC); and when the mobile phase is gas, it is called as gas chromatography (GC). Recently, supercritical fluid chromatography (SFC) which uses supercritical fluid as the mobile phase is used, too. Furthermore, in order to enhance separation performance, high-performance liquid chromatography (HPLC) which uses fine particles of about μm as a stationary phase (separation column) is widely used.

As the sample injection methods in this chromatography, so-called a sample loop type and a direct injection type are generally known. In the sample loop type method: a tube (sample loop) of a predetermined volume is disposed detachably to a liquid transfer channel of a mobile phase; a sample is injected to the sample loop in a detached state; and the sample loop is mounted to the liquid transfer channel by operating a channel switching valve, so that the sample solution is injected to a separation column.

When the mobile phase actually flows through the liquid transfer channel under a high pressure, the pressure inside the sample loop needs to be released. With a sample injection device having a predetermined configuration that employs a syringe and a stop valve (a valve for switching open/close) as shown in FIG. 7, for example, the sample can be injected while the pressure inside the sample loop is released.

When separation analysis is to be performed by chromatography, it is often sufficient if the sample can be injected to the sample loop in units of μl; however, a large volume of the sample, such as of several milliliters to several ten milliliters, needs to be injected to the sample loop to perform fractionation, for example. In the sample injection device of the sample loop type shown in FIG. 7, however, the total amount of the sample that can be injected to the sample loop by continuous injection is limited to the volume of the syringe, and thus it is difficult to continuously inject a large volume of several ten milliliters.

Thus, a large-volume sample injection by continuous injection becomes possible by adopting a sample injection device of a so-called direct injection type having a predetermined configuration that uses a syringe and a needle as shown in FIG. 8. Although a large-volume sample injection becomes possible in this configuration, however, it is difficult to release the pressure of the sample loop in such configuration. Accordingly, it cannot be employed in high-performance liquid chromatography and supercritical fluid chromatography under a super high pressure.

In Patent Literature 1, an auto sampler having a pressure releasing actuation unit is provided. By controlling actions of a needle driving mechanism and a switching mechanism, the switching mechanism is switched before the tip of a needle is pulled out of an injection port while a sampling passage is interposed between a liquid transfer device and an analytical column so that the sampling passage does not exist between the liquid transfer device and the analytical column, and a system including the sampling passage is released, and the pressure releasing actuation unit stands by until the pressure inside the sampling passage returns to atmospheric pressure. As a result, the pressure inside the sampling passage returns to atmospheric pressure before the tip of the needle is pulled out from the injection port, and thus the mobile phase can be prevented from being ejected from the tip of the needle when the tip of the needle is pulled out from the injection port.

CITATION LIST

Patent Literature

PATENT LITERATURE 1: Japanese Patent No. 6365323 B

DISCLOSURE OF THE INVENTION

Problem to be Solved by the Invention

As in Patent Literature 1, releasing of the pressure of the sample loop and a large-volume sample injection can be achieved by comprising a predetermined pressure releasing actuation unit or the like even in a configuration that uses a syringe and a needle; however, it is difficult to utilize the configuration of Patent Literature 1 to supercritical fluid chromatography or the like, for example, because hermeticity (or pressure resistance) of the needle depends on sealing property of the tip of the needle, and hermeticity of the seal part of the tip of the needle is actually low.

Means to Solve the Problem

The present invention has been accomplished in view of the above-mentioned conventional art, and an object thereof is to provide a large-volume sample injection device which has pressure resistance that can be used in high-performance liquid chromatography, supercritical fluid chromatography or the like, is capable of continuous injection at short intervals, and has a simple configuration.

In order to solve the above problem, a sample injection device according to the present invention comprises:

a sample container that at least contains a sample inside thereof; a sample loop that temporary retains the sample to be injected to a separation column; a syringe that sucks the sample from the sample container to inject the sample to the sample loop; a liquid transfer channel where a mobile-phase solvent flows to the separation column by a liquid transfer pump; a first channel switching valve that switches the sample loop to be detachable to the liquid transfer channel; and a second channel switching valve that switches a channel of the syringe together with the first channel switching valve, wherein:

the first channel switching valve is used to at least connect the sample loop to the liquid transfer channel;

the second channel switching valve is connected to: a sample suction tube which is a channel that sucks the sample from the sample container; a decompression part having a sample loop pressure-releasing function; a drain part for draining the sample; the syringe; and the first channel switching valve, and selects at least either one of the sample suction tube or the decompression part to connect to the first channel switching valve;

the liquid transfer channel is a channel where the mobile-phase solvent pressurized by the liquid transfer pump flows to the separation column, said liquid transfer channel passes through the first channel switching valve or the first channel switching valve and the sample loop, and does not pass through the second channel switching valve;

the first channel switching valve and the second channel switching valve have a two-position switching function capable of switching into two positions;

the second channel switching valve comprises a stator part that has six holes at vertex positions of a regular octagon, and a rotor part that rotates in contact with the stator part to switch the channel; and the rotor part has three channel grooves, and two of the through holes and one of the channel grooves are disposed to face and be in close contact with each other to form a channel.

According to the sample injection device according to the present invention, the first channel switching part comprises:

a stator part having six through holes at vertex positions of a regular hexagon, and a rotor part having three channel grooves.

The sample injection device according to the present invention is used for sample injection in high-performance liquid chromatography or supercritical fluid chromatography.

The channel switching valve that can be used in the sample injection device for chromatography according to the present invention has a two-position switching function capable of switching into two positions, wherein the channel switching valve comprises a stator part that has six through holes at vertex positions of a regular octagon, and a rotor part that rotates in contact with the stator part to switch a channel, the rotor part has three channel grooves, and two of the through holes and one of the channel grooves are disposed to face and be in close contact with each other to form a channel, the six through holes are configured of: a first through hole (g) connected to a sample suction tube that is a channel for sucking a sample from a sample container; a second through hole (h) connected to a first channel switching valve that is used to form a liquid transfer channel for flowing a mobile-phase solvent; a third through hole (i) connected to a decompression part that has a sample loop pressure-releasing function; a fourth through hole (j) connected to the first channel switching valve; a fifth through hole (k) connected to a syringe that sucks the sample from the sample container to inject the sample to the sample loop; and a sixth through hole (l) connected to a drain part for draining a solution, the sample loop has a function of temporarily retaining the sample to be injected to a separation column, and the sample loop can be connected via the first channel switching valve to the liquid transfer channel, in a first switched state of the two-position switching function: the third through hole (i), the fourth through hole (j) and the channel groove form a channel; the fifth through hole (k), the sixth through hole (l) and the channel groove form a channel; and the first through hole (g) and the second through hole (h) do not form a channel and are in a closed state, in a second switched state of the two-position switching function: the first through hole (g), the second through hole (h) and the channel groove form a channel; the fourth through hole (j), the fifth through hole (k) and the channel groove form a channel; and the third through hole (i) and the sixth through hole (l) do not form a channel and are in a closed state, and the channel switching valve in the second switched state can be connected via the first channel switching valve to the sample loop.

Effect of the Invention

According to the present invention, a sample injection device can be provided. The sample injection device comprises a first channel switching valve and a second channel switching valve having a characteristic configuration. A stator part of the second channel switching valve is provided with six through holes are provided at vertex positions of a regular octagon, and a rotor part is provided with three channel grooves. By switching a channel by a prescribed switching action in accordance with a condition of sample injection, the sample injection device having a simple configuration can achieve pressure resistance that can be utilized in liquid chromatography or supercritical fluid chromatography, and a large-volume sample injection by continuous injection at short intervals becomes possible.

BEST MODE FOR CARRYING OUT THE INVENTION

Hereinbelow, the sample injection device of the present invention is described with reference to the figures; however, the present invention is not limited to the examples given below as long as the aim of the present invention is not exceeded.

Figure 1:
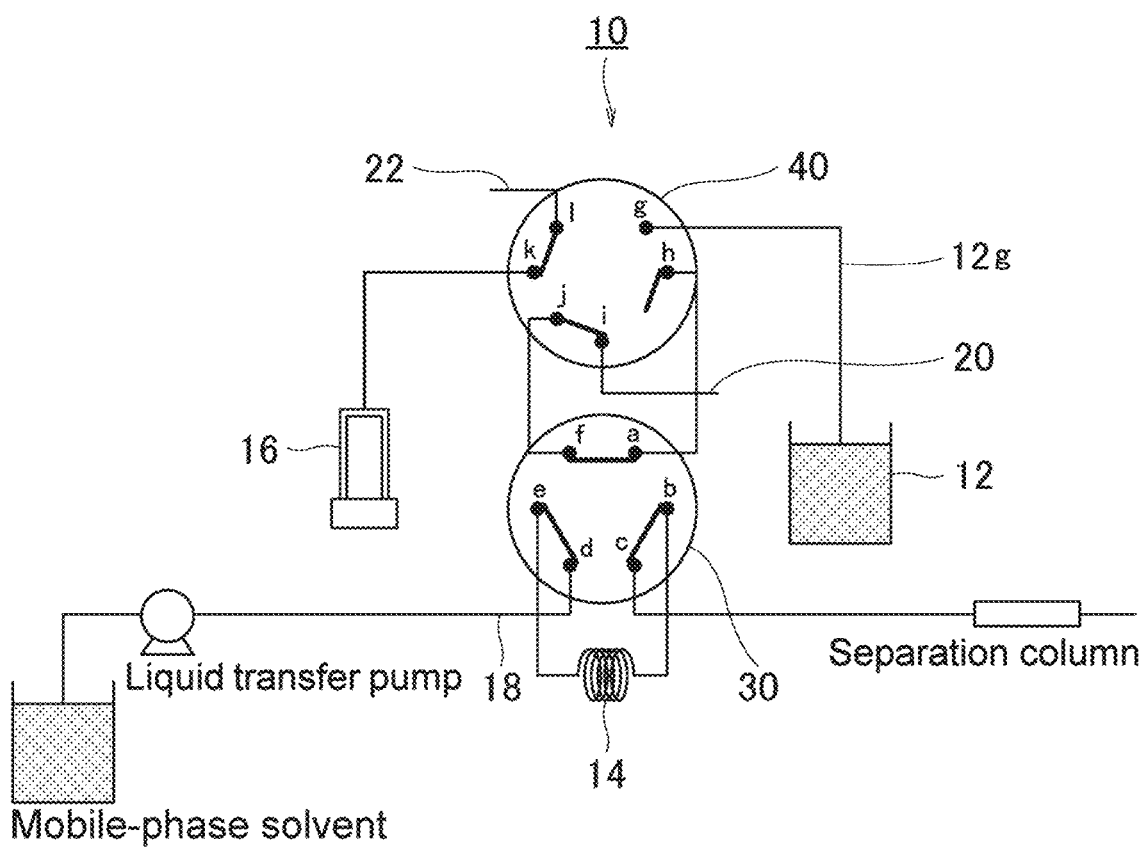
FIG. 1 shows a schematic configuration of a sample injection device according to an embodiment of the present invention.

FIG. 1 shows a schematic configuration of a sample injection device according to an embodiment of the present invention. In the present description, the sample injection device refers to a configuration for injecting a sample to a separation column in chromatographic analysis, for example. A sample injection device 10 shown in FIG. 1 comprises: a sample container 12 (sample suction tube 12g) that at least contains a sample inside thereof; a sample loop 14 that temporarily retains the sample to be injected to a separation column; a syringe 16 that sucks the sample from the sample container 12 to inject the sample to the sample loop 14; a liquid transfer channel 18 that is a channel where a mobile phase flows to the separation column by a liquid transfer pump; a drain part 22 for draining various solutions; and a decompression part 20 for releasing pressure in the sample loop 14.

Furthermore, the sample injection device 10 shown in FIG. 1 comprises: a first channel switching valve 30 that switches the sample loop 14 to be detachable to the liquid transfer channel 18; and a second channel switching valve 40 that switches the channel of the syringe 16 together with the first channel switching valve 30. Switching action of the channel will be described later. The first channel switching valve and the second channel switching valve have a two-position switching function which is capable of switching into two positions. That is, the sample injection device 10 according to the present embodiment forms a predetermined channel by the first channel switching valve 30 and the second channel switching valve 40 to perform a sample injection action to the separation column.

The first channel switching valve 30 in the present embodiment is configured with six through holes ((a) to (f)) for forming a predetermined channel. Furthermore, the second channel switching valve 40 is configured with six through holes ((g) to (l)). In the second channel switching valve 40 that has a characteristic configuration of the present invention: a through hole (g) is connected to the sample container 12 (sample suction tube 12g); a through hole (h) is connected to a through hole (a) of the first channel switching valve 30; and a through hole (i) is connected to the decompression part 20. Furthermore, a through hole (j) is connected to a through hole (f) of the first channel switching valve 30; a through hole (k) is connected to the syringe 16; and a through hole (l) is connected to the drain part 22.

In the first channel switching valve 30, a through hole (b) is connected to one end of the sample loop 14, and a through hole (e) is connected to the other end of the sample loop 14. Furthermore, a through hole (c) is connected to the liquid transfer channel 18 on the separation column side, and a through hole (d) is connected to the liquid transfer channel 18 on the liquid transfer pump side.

The sample container 12 contains the sample to be subjected to chromatography. The sample is sucked through the sample suction tube 12g. The sample loop 14 is to temporarily retain the sample as a target of analysis to be injected to the separation column. The syringe 16 sucks the sample contained in the sample container 12, and then injects the sucked sample to the sample loop 14.

The decompression part 20 is provided to release the pressure of the sample loop 14 (action to bring the pressure inside the sample loop back to atmospheric pressure). The sample injection device 10 of the present embodiment is capable of releasing the pressure of the sample loop 14 by this decompression part 20, so that it can be used in high-performance liquid chromatography or supercritical fluid chromatography, for example, in which the pressure of the sample loop needs to be released.

The drain part 22 is a part that drains solution or air that remains after performing the sample injection action, or where a cleansing solution or the like is sucked in a cleansing step. In the sample injection device 10 according to the present embodiment, the sample container 12, the sample loop 14, the syringe 16, the decompression part 20, and the drain part 22 are switched to predetermined channels by the first channel switching valve 30 and the second channel switching valve 40, respectively, to perform the sample injection action.

Figure 2:
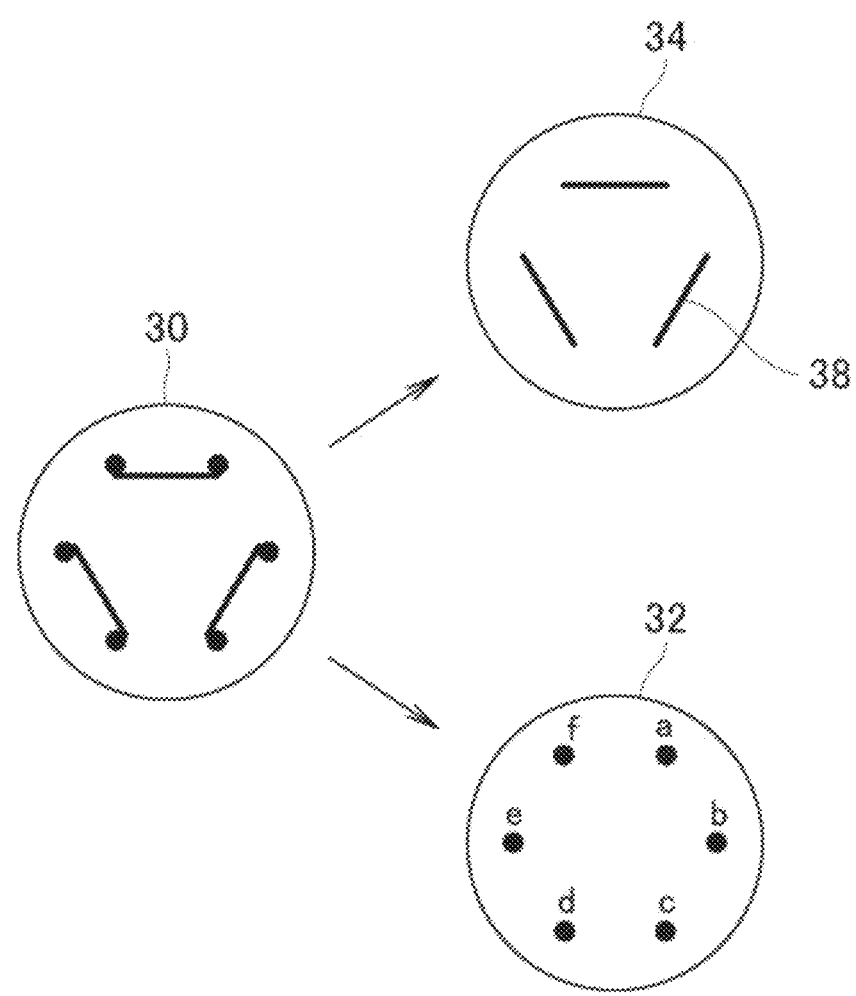
FIG. 2 shows a schematic configuration of a first channel switching valve according to the embodiment of the present invention.

Here, configurations of the first channel switching valve 30 and the second channel switching valve 40 are described in detail. FIG. 2 shows a schematic configuration of the first channel switching valve 30 according to the present embodiment. As shown in FIG. 2, the first channel switching valve 30 is configured such that a stator part 32 and a rotor part 34 overlap with each other. The stator part 32 (a face that overlaps with the rotor part 34) is approximately spherical, and is provided with through holes (a) to (f) at vertex positions of a regular hexagon.

The rotor part 34 is approximately spherical, and is provided with three channel grooves 38 at regular intervals. The rotor part 34 is provided to be rotatable in contact with the stator part 32. The stator part 32 and the rotor part 32 rotate in contact with each other, and two of the adjacent through holes and one of the channel grooves 38 face each other (e.g. the through holes (b), (c) and one of the channel grooves 38), so that they are disposed in close contact to form a predetermined channel.

Figure 3:
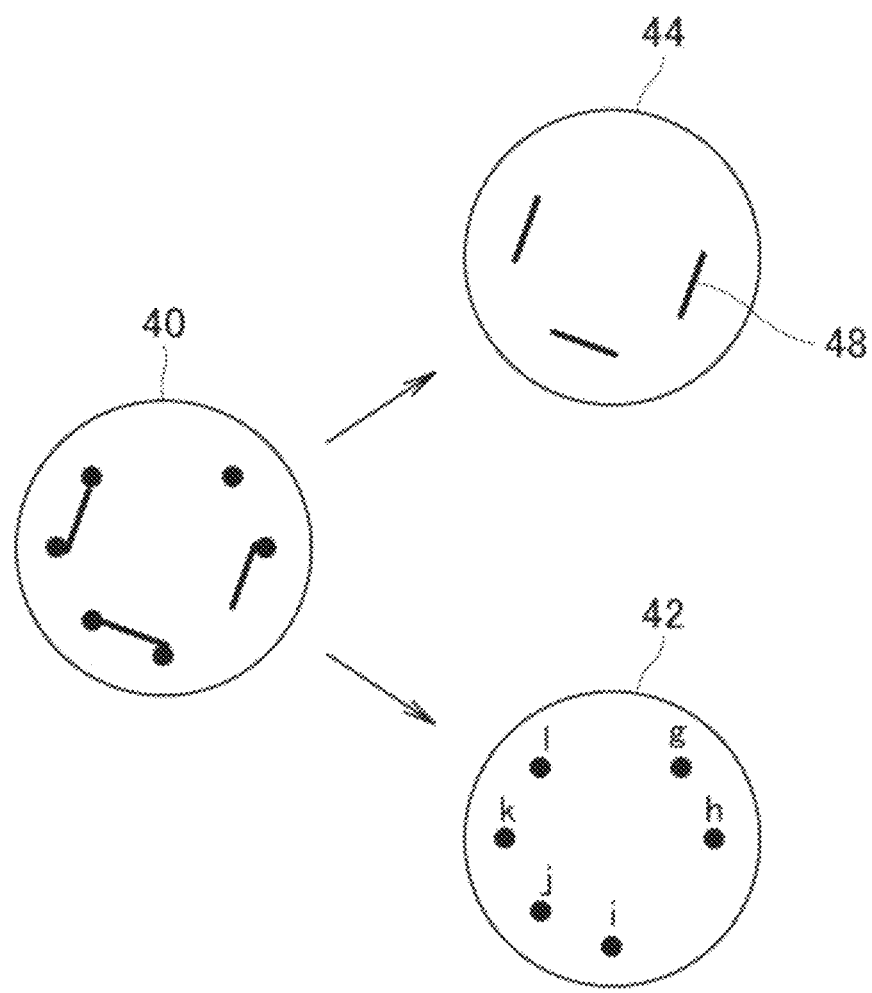
FIG. 3 shows a schematic configuration of a second channel switching valve according to the embodiment of the present invention.

FIG. 3 shows a schematic configuration of the second channel switching valve according to the present embodiment. Like in the first channel switching valve 30, the second channel switching valve 40 shown in FIG. 3 is configured such that a stator part 42 and a rotor part 44 overlap with each other. As shown in FIG. 3, the stator part 42 of the second channel switching valve 40 is provided with through holes (g) to (l) at six positions among vertex positions of a regular octagon. Disposition of the through holes is not limited in particular, as long as an injection sequence and a cleansing sequence to be described later can be performed. The through holes are connected to each configuration parts (i.e. the sample container 12, the syringe 16, and the like), respectively, as described above. The rotor part 44 is provided with three channel grooves 48.

Like the first channel switching valve 30, the rotor part 44 and the stator part 42 are provided to be rotatable in contact with each other in the second channel switching valve 40. The stator part 42 and the rotor part 44 rotate in contact with each other, and two of the adjacent through holes and one of the channel grooves 48 face each other (e.g. the through holes (i), (j) and the channel groove 48), so that they are disposed in close contact to form a predetermined channel.

As shown in FIG. 3, in the present embodiment, the stator part 42 of the second channel switching valve 40 is provided with six through holes (g) to (l); however, it is not limited to this configuration, and can be configured with (n−1) through holes at vertex positions of a regular n-polygon (n is an equal number), for example. In this case, the rotor part 44 of the second channel switching valve 40 is preferably configured with ((n/2)−1) channel grooves 48.

Since it is sufficient for the first channel switching valve 30 to perform the sample injection action of the present embodiment, numbers and positions of the through holes and the channel grooves 38 can be suitably changed in accordance with the configuration of the second channel switching valve 40.

Figure 4:
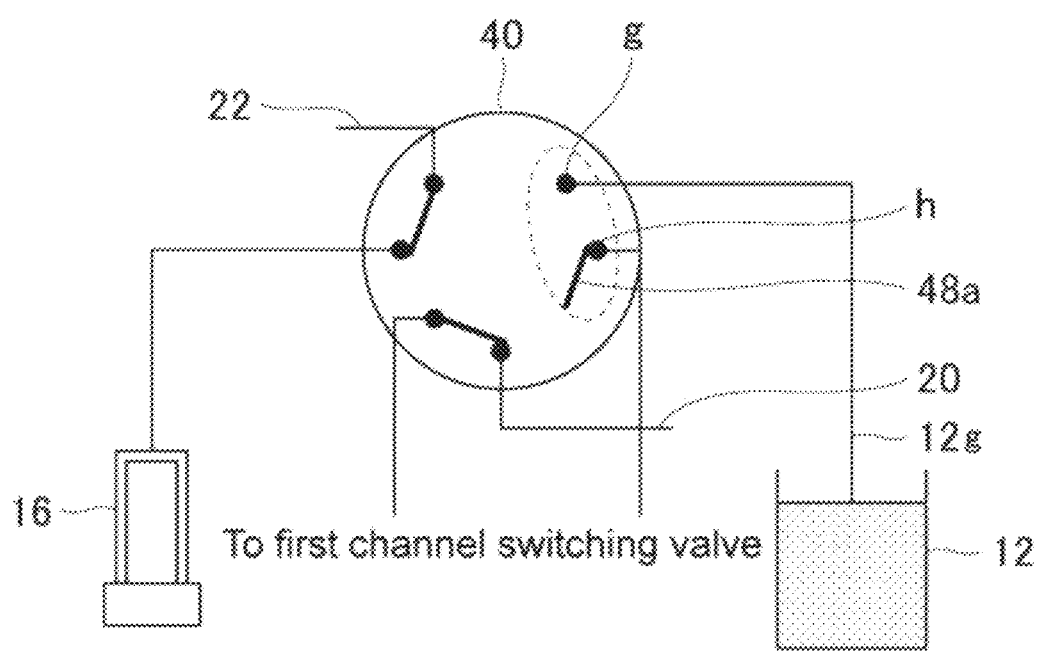
FIG. 4 is a schematic explanation diagram of a channel state by the second channel switching valve according to the embodiment of the present invention.

FIG. 4 is a schematic explanation diagram of a channel state by the second channel switching valve 40 according to the present embodiment. The channel shown in FIG. 4 shows the second channel switching valve 40 and its channel in FIG. 1. As stated above, the stator part 42 is provided with six through holes, and the rotor part 44 is provided with three channel grooves 48. By the disposition of the through holes and the channel grooves 48, a channel necessary for the sample injection action is formed. In FIG. 4, for example, a channel is formed between the syringe 16 and the drain part 22, and a channel is formed between the first channel switching valve 30 side and the decompression part 20.

When looking at the sample container 12 of FIG. 4, it can be seen that the sample container 12 is not connected to other configurations in this state. That is, in the channel switching valve 40, the through hole is not provided to a part of the stator part 42 (in the present embodiment, between (g) and (l), and between (h) and (i) in FIG. 1), and the channel groove 48 is not provided to a part of the rotor part 44, so that a stop valve for blocking the channel between other configurations is formed.

In the present embodiment, the second channel switching valve 40 configures the stop valve with the through holes (h), (g) and the channel groove 48a as shown in FIG. 4. That is, the channel of the sample container 12 forms the channel with the first channel switching valve 30 side, or the channel becomes blocked.

Figure 7:
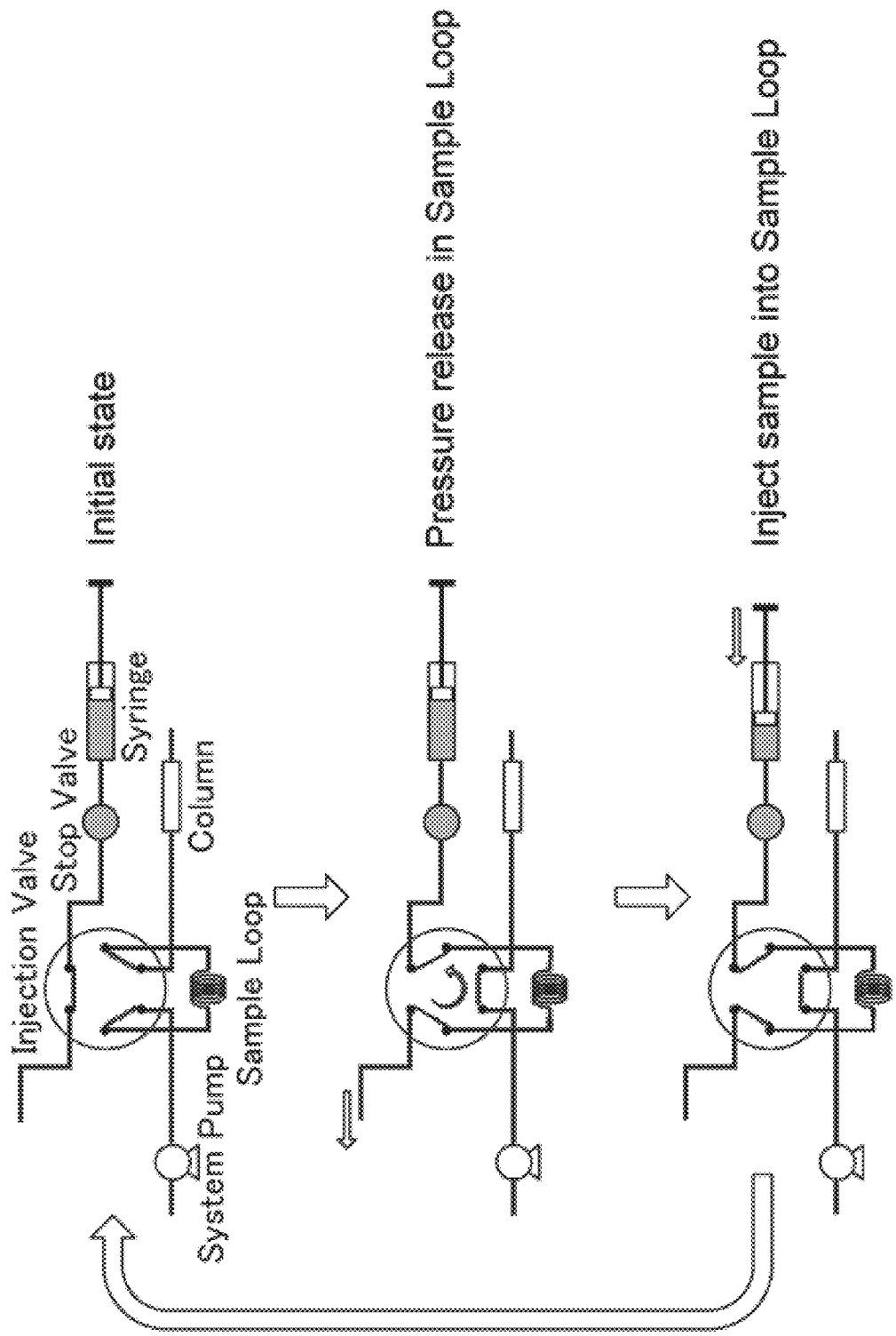
FIG. 7 is a schematic view of a sample loop typed sample injection device that employs a syringe and a stop valve.
Figure 8:
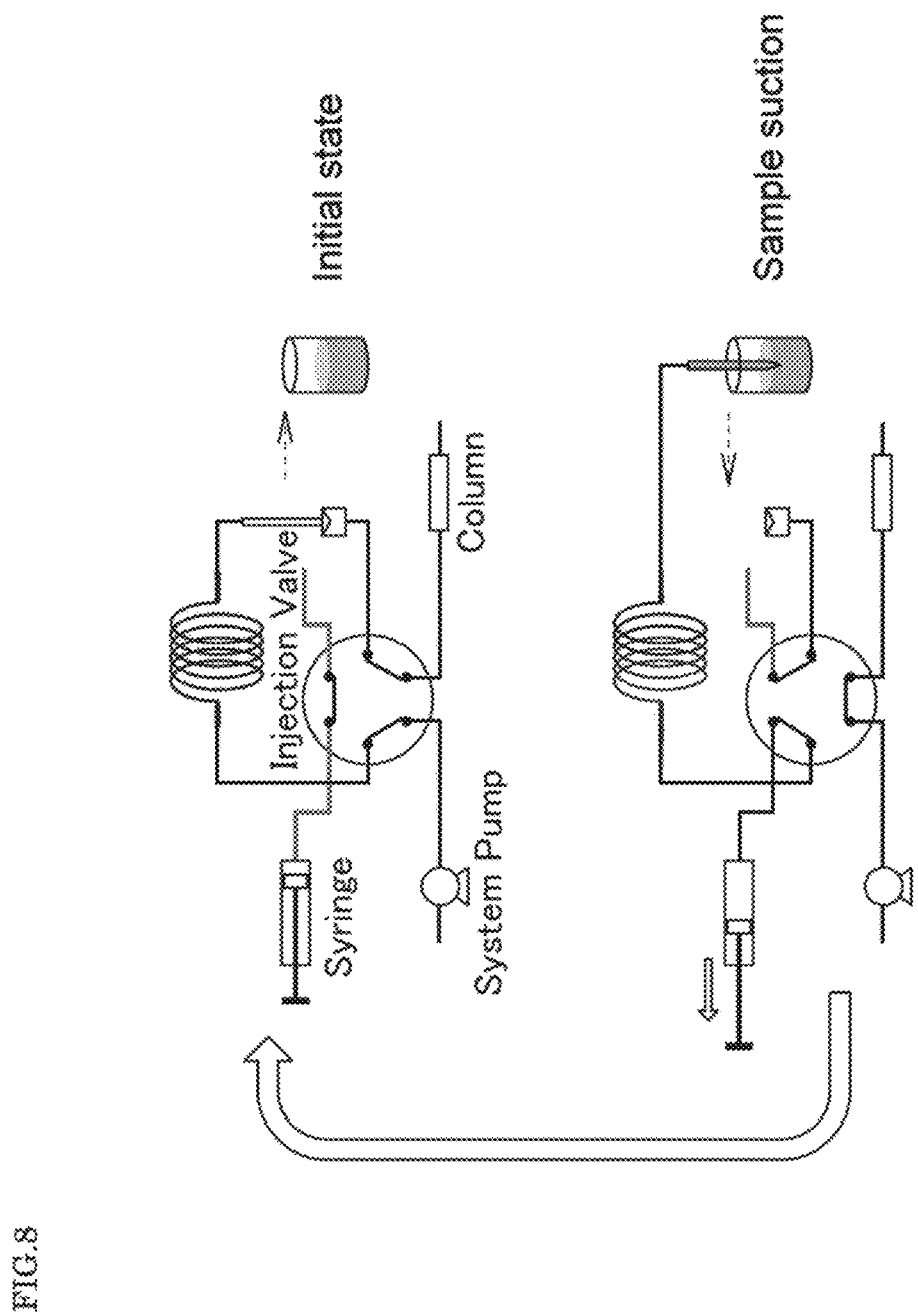
FIG. 8 is a schematic view of a direct injection typed sample injection device that employs a syringe and a needle.

For example, in the sample loop typed sample injection device shown in FIG. 7 stated above, a stop valve is provided separately from the channel switching valve to block the channel from the syringe. In the present embodiment, however, a stop valve does not need to be provided separately from the channel switching valve because of the characteristic configuration of the second channel switching valve 40.

The sample injection device 10 (and the channel switching valves 30, 40) is schematically configured as described above in the present embodiment. Hereinbelow, an injection sequence of the sample in chromatography is described in detail.

<Injection Sequence>

Figure 5:
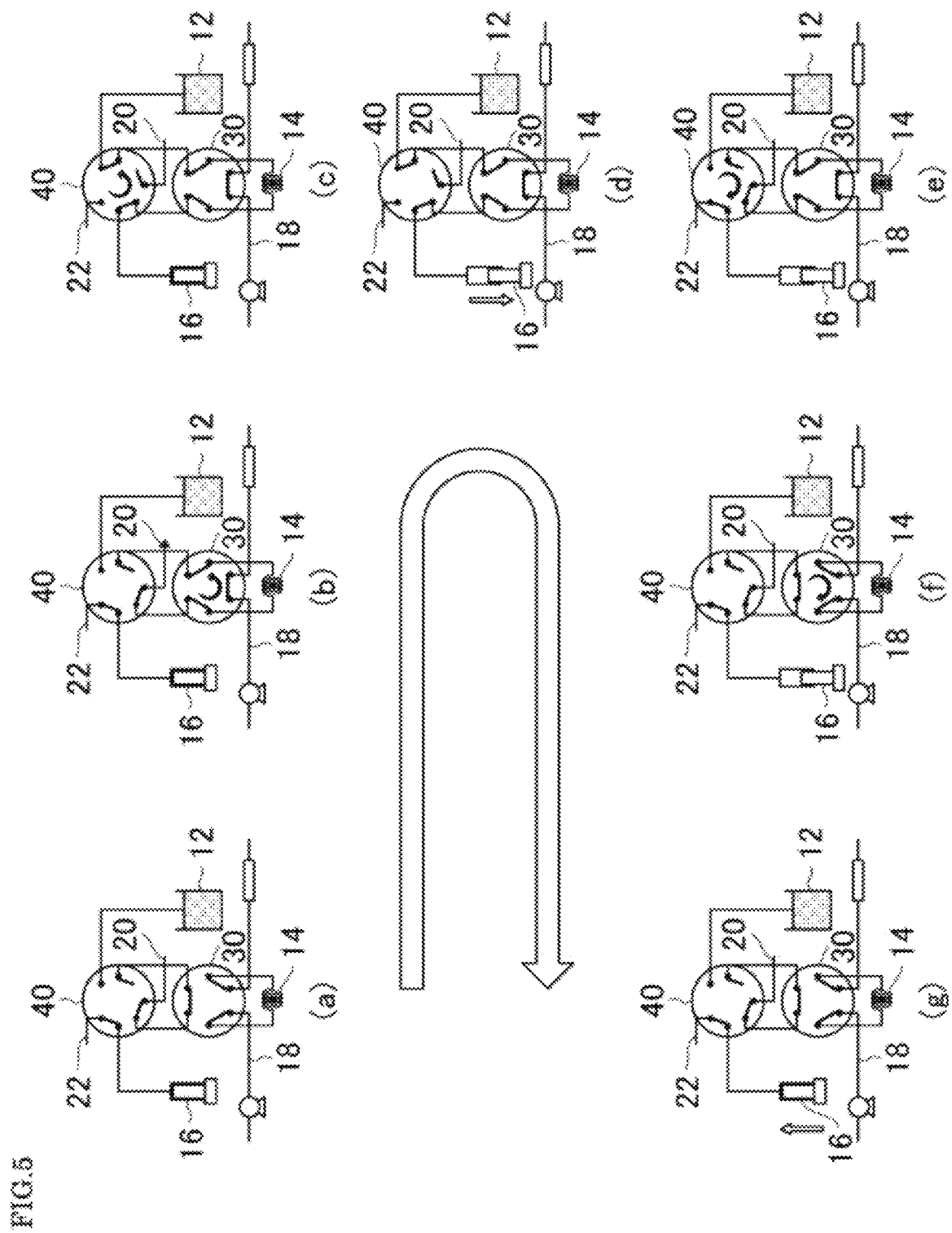
FIG. 5 is a schematic explanation diagram of an injection sequence in the sample injection device according to an embodiment of the resent invention.

FIG. 5 shows a schematic explanation diagram of the injection sequence in the sample injection device according to the embodiment of the present invention. FIG. 5 (a) to (g) show each channel state of the sample injection device 10 in the present embodiment. The channel states of (a) to (g) are described in order.

FIG. 5 (a) shows a primary state of the sample injection device 10 in chromatography. In FIG. 5 (a), the sample loop 14 is mounted to the liquid transfer channel 18, and the syringe 16 and the sample 12 are not connected (a channel is formed between the syringe 16 and the drain part 22).

When the rotor part 34 of the first channel switching valve 30 is rotated in an anti-clockwise direction (the second channel switching valve 40 is not moved) from this channel state, the sample injection device 10 becomes into a channel state of FIG. 5 (b). At this point, the sample loop 14 is detached from the liquid transfer channel 18 (the channel is separated), and a channel is formed between the decompression part 20. That is, in the channel state of FIG. 5 (b), the pressure inside the sample loop 14 can be released.

Next, as shown in FIG. 5 (c), the rotor part 44 of the second channel switching valve 40 is rotated in a clockwise direction to switch each channel. In this channel state, the syringe 16 is connected via the sample loop 14 to the sample container 12 (the sample suction tube 12g). In this channel state, the syringe 16 performs suction as shown in FIG. 5 (d), so that the sample contained inside the sample container 12 can be injected to the sample loop 14. At this point, the sample loop 14 is separated from the liquid transfer channel 18.

Then, as shown in FIG. 5 (e), the rotor part 44 of the second channel switching valve 40 is rotated in a clockwise direction, so that the sample loop 14 becomes separated from the syringe 16 (and the sample container 12). Furthermore, the sample container 12 becomes blocked from other configurations since the relevant parts of the second channel switching valve 40 (the through holes (g), (h) and the channel groove 48a in FIG. 4) acts as a stop valve.

Furthermore, as shown in FIG. 5 (f), the first channel switching valve 30 is rotated in a clockwise direction, so that the sample loop 14 becomes mounted to the liquid transfer channel 18. At this point, a predetermined amount of the sample is injected to the sample loop 14 by suction performed by the syringe 16, so that the sample is injected with the mobile phase that is flown by the liquid transfer pump to the separation column.

Then, as shown in FIG. 5 (g), the solution and air that remain inside the syringe 16 are drained from the drain part 22 by pressing action performed by the syringe 16. By this action, the sample injection device returns to the primary state of FIG. 5 (a). That is, by repeating the sample injection sequence from FIG. 5 (a) to (g) (and the channel switching action), continuous injection of the sample at short intervals becomes possible, and thus a large volume of the sample can be injected to the separation column.

In the sample injection device 10 in the present embodiment, parts that are low in pressure resistance such as needles, for example, are not used, and the pressure of the sample loop 14 can be released during the sample injection sequence. Therefore, the sample injection device 10 can be satisfactorily used in high-performance chromatography and supercritical fluid chromatography.

As described above, the sample injection device 10 according to the present embodiment uses the second channel switching valve 40 having a characteristic valve configuration (and the first channel switching valve 30) to perform a predetermined sample injection sequence as stated above, so that problems of pressure resistance do not need to be concerned, and a large-volume sample injection can be accomplished with a simple configuration and a pressure-releasing mechanism.

Furthermore, since continuous injection of the sample can be achieved in the present embodiment, the following sample injection action can be performed during the first chromatographic analysis, and, as a result, a great shortening of analysis time can be expected.

<Cleansing Sequence>

Figure 6:
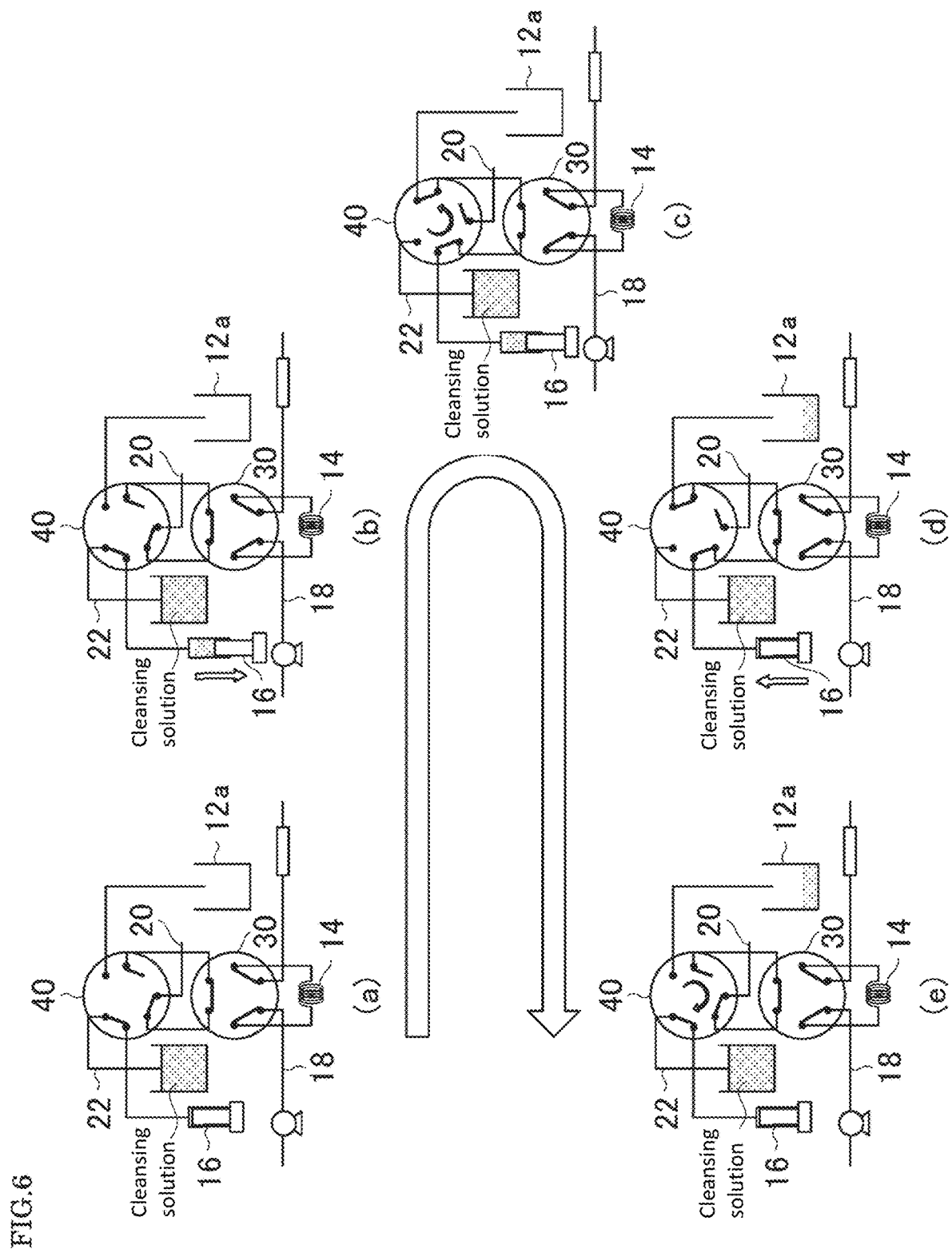
FIG. 6 is a schematic explanation diagram of a cleansing sequence in the sample injection device according to an embodiment of the resent invention.

Next, the cleansing sequence of the present embodiment is described. FIG. 6 shows a schematic explanation diagram of the cleansing sequence in the sample injection device according to the embodiment of the present invention. FIG. 6 (a) to (e) show each channel state of the sample injection device 10 at cleansing of the present embodiment, and the channel states shown in (a) to (e) are described in order. In this cleansing sequence, cleansing is needed to be performed to the channel where the sample has passed at the sample injection action. The sample loop 14 does not need to be cleansed because the sample is flown by the mobile phase.

First of all, as shown in FIG. 6 (a), a cleansing solution for cleansing the sample injection device 10 is set to the drain part 22. At this point, a channel is formed between the syringe 16 and the drain part 22. In this cleansing sequence, the sample loop 14 is always mounted to the liquid transfer channel 18.

As shown in FIG. 6 (b), the cleansing solution is injected into the syringe 16 by suction performed by the syringe 16. Then, as shown in FIG. 6 (c), the rotor part 44 of the second channel switching valve 40 is rotated in an anti-clockwise direction to switch the channel. At this point, a channel is formed from the syringe 16 through the channel of the first channel switching valve 30 to a waste liquid container 12a. That is, a channel is formed between the channel (referred to as a cleansing channel, hereinafter) where the sample has passed when it is sucked from the sample container 12 in the sample injection action described above (it is replaced with the waste liquid container 12a in FIG. 6) and the syringe 16.

Then, as shown in FIG. 6 (*d*), the syringe 16 performs pressing action to flow the cleansing solution to the cleansing channel where the sample has passed at the sample injection action. The cleansing solution that passed the cleansing channel in this cleansing sequence is drained to the waste liquid container 12a. Then, as shown in FIG. 6 (*e*), the second channel switching valve 40 is rotated in a clockwise direction, so that it can go back to the primary state.

As described above, in the cleansing sequence of the sample injection device 10 according to the present embodiment, only the channel where the sample has passed at the sample injection action can be cleansed, so that the cleansing channel can be cleansed effectively with a small amount of the cleansing solution. Furthermore, in the present embodiment, a separate channel switching valve does not need to be prepared to form a channel for the cleansing sequence, so that a large-volume sample injection and cleansing can be performed while maintaining a simple configuration.

As stated above, the sample injection device 10 according to the present invention comprises the second channel switching valve 40 having a characteristic configuration. The stator part 42 of the second channel switching valve 40 is provided with six through holes at vertex positions of a regular octagon, and the rotor part 44 is provided with three channel grooves 48 to switch the channel by a predetermined switching action. Therefore, the sample injection device 10 according to the present invention has a predetermined pressure resistance, is capable of continuous injection of a large volume of the sample at short intervals, and can cleanse effectively with a simple configuration.

In addition, the second channel switching valve 40 according to the present invention can be applied to general sample injection devices, too. In this case, for example, the first channel switching valve according to the present embodiment can be used together, or the configuration of the first channel switching valve can be changed suitably in accordance with analysis conditions, so that continuous injection of a large volume of the sample can be achieved in high-performance liquid chromatography or supercritical fluid chromatography.

The sample injection device 10 and the characteristic second channel switching valve 40 according to the present embodiment can be applied to analysis devices other than high-performance liquid chromatography or supercritical fluid chromatography, and achieve similar effects.

DESCRIPTION OF REFERENCE SIGNS

10 Sample injection device
12 Sample container
12a Waste liquid container
12g Sample suction tube
14 Sample loop
16 Syringe
18 Liquid transfer channel
20 Decompression part
22 Drain part
30 First channel switching valve
32 Stator part
34 Rotor part
(a)-(f) Through holes
38 Channel grooves
40 Second channel switching valve
42 Stator part
44 Rotor part
(g)-(l) Through holes
48 Channel grooves

What is claimed is:

1. A sample injection device comprising:
a sample container that at least contains a sample inside thereof; a sample loop that temporary retains the sample to be injected to a separation column; a syringe that sucks the sample from the sample container to inject the sample to the sample loop; a liquid transfer channel where a mobile-phase solvent flows to the separation column by a liquid transfer pump; a first channel switching valve that switches the sample loop to be detachable to the liquid transfer channel; and a second channel switching valve that switches a channel of the syringe together with the first channel switching valve, wherein:
the first channel switching valve is used to at least connect the sample loop to the liquid transfer channel;
the second channel switching valve is connected to: a sample suction tube which is a channel that sucks the sample from the sample container; a decompression part having a sample loop pressure-releasing function; a drain part for draining the sample; the syringe; and the first channel switching valve, and selects at least either one of the sample suction tube or the decompression part to connect to the first channel switching valve;
the liquid transfer channel is a channel where the mobile-phase solvent pressurized by the liquid transfer pump flows to the separation column, said liquid transfer channel passes through the first channel switching valve, or the first channel switching valve and the sample loop, and does not pass through the second channel switching valve;
the first channel switching valve and the second channel switching valve have a two-position switching function capable of switching into two positions;
the second channel switching valve comprises a stator part that has six holes at vertex positions of a regular octagon, and a rotor part that rotates in contact with the stator part to switch the channel; and
the rotor part has three channel grooves, and two of the through holes and one of the channel grooves are disposed to face and be in close contact with each other to form a channel.

2. The sample injection device according to claim 1, wherein the first channel switching valve comprises a stator part having six through holes at vertex positions of a regular hexagon, and a rotor part having three channel grooves.

3. The sample injection device according to claim 2, wherein the sample injection device is used for sample injection in high-performance liquid chromatography or supercritical fluid chromatography.

4. The sample injection device according to claim 1, wherein the sample injection device is used for sample injection in high-performance liquid chromatography or supercritical fluid chromatography.

5. A channel switching valve that can be used in a sample injection device for chromatography, wherein
the channel switching valve has a two-position switching function capable of switching into two positions,
the channel switching valve comprises a stator part that has six through holes at vertex positions of a regular octagon, and a rotor part that rotates in contact with the stator part to switch a channel, the rotor part has three channel grooves, and two of the through holes and one of the channel grooves are disposed to face and be in close contact with each other to form a channel, the six through holes are configured of: a first through hole (g) connected to a sample suction tube that is a channel for sucking a sample from a sample container; a second through hole (h) connected to a first channel switching valve that is used to form a liquid transfer channel for flowing a mobile-phase solvent; a third through hole (i) connected to a decompression part that has a sample loop pressure-releasing function; a fourth through hole (j) connected to the first channel switching valve; a fifth through hole (k) connected to a syringe that sucks the sample from the sample container to inject the sample to the sample loop; and a sixth through hole (l) connected to a drain part for draining a solution, the sample loop has a function of temporarily retaining the sample to be injected to a separation column, and the sample loop can be connected via the first channel switching valve to the liquid transfer channel, in a first switched state of the two-position switching function: the third through hole (i), the fourth through hole (j) and the channel groove form a channel; the fifth through hole (k), the sixth through hole (l) and the channel groove form a channel; and the first through hole (g) and the second through hole (h) do not form a channel and are in a closed state, in a second switched state of the two-position switching function: the first through hole (g), the second through hole (h) and the channel groove form a channel; the fourth through hole (j), the fifth through hole (k) and the channel groove form a channel; and the third through hole (i) and the sixth through hole (l) do not form a channel and are in a closed state, and the channel switching valve in the second switched state can be connected via the first channel switching valve to the sample loop.

* * * * *